United States Patent
Chaudhry et al.

(10) Patent No.: US 8,591,787 B2
(45) Date of Patent: Nov. 26, 2013

(54) FOAM PATTERNS

(75) Inventors: Anil R. Chaudhry, Xenia, OH (US); Robert Dzugan, Cincinnati, OH (US); Richard M. Harrington, Cincinnati, OH (US); Faurice D. Neece, Lyndhurst, OH (US); Nipendra P. Singh, Pepper Pike, OH (US); Travis Westendorf, Dayton, OH (US)

(73) Assignee: IC Patterns, LLC, Miamisburg, OH (US)

( * ) Notice: Subject to any disclaimer, the term of this patent is extended or adjusted under 35 U.S.C. 154(b) by 218 days.

(21) Appl. No.: 13/154,667

(22) Filed: Jun. 7, 2011

(65) Prior Publication Data

US 2012/0007266 A1  Jan. 12, 2012

Related U.S. Application Data

(63) Continuation-in-part of application No. 12/167,546, filed on Jul. 3, 2008, now Pat. No. 7,958,932.

(60) Provisional application No. 60/947,941, filed on Jul. 3, 2007.

(51) Int. Cl.
  *B29C 33/38* (2006.01)
(52) U.S. Cl.
  USPC ........... 264/227; 264/219; 264/220; 264/221; 264/225; 264/226; 264/271.1; 264/275; 264/277; 264/279; 264/279.1; 264/610; 264/317; 264/344; 264/41; 164/45
(58) Field of Classification Search
  USPC ................. 264/219, 220, 221, 225, 226, 227, 264/271.1, 275, 277, 279, 279.1, 610, 317, 264/334, 41; 164/45
  See application file for complete search history.

(56) References Cited

U.S. PATENT DOCUMENTS

| | | | |
|---|---|---|---|
| 3,723,584 A | * | 3/1973 | Nussbaum .................. 264/46.6 |
| 3,747,663 A | | 7/1973 | Taylor |
| 4,240,492 A | | 12/1980 | Edwards et al. |
| 4,397,247 A | | 8/1983 | Lemelson |
| 4,650,626 A | * | 3/1987 | Kurokawa ..................... 264/278 |
| 4,660,623 A | | 4/1987 | Ashton |
| 4,877,078 A | | 10/1989 | Wittmoser |

(Continued)

FOREIGN PATENT DOCUMENTS

| | | | | |
|---|---|---|---|---|
| JP | 62083112 A | * | 4/1987 | |
| JP | 62263844 A | * | 11/1987 | |

(Continued)

*Primary Examiner* — Timothy Kennedy
(74) *Attorney, Agent, or Firm* — Thomas E. Lees, LLC

(57) ABSTRACT

A method of creating a foam pattern comprises mixing a polyol component and an isocyanate component to form a liquid mixture. The method further comprises placing a temporary core having a shape corresponding to a desired internal feature in a cavity of a mold and inserting the mixture into the cavity of the mold so that the mixture surrounds a portion of the temporary core. The method optionally further comprises using supporting pins made of foam to support the core in the mold cavity, with such pins becoming integral part of the pattern material simplifying subsequent processing. The method further comprises waiting for a predetermined time sufficient for a reaction from the mixture to form a foam pattern structure corresponding to the cavity of the mold, wherein the foam pattern structure encloses a portion of the temporary core and removing the temporary core from the pattern independent of chemical leaching.

20 Claims, 11 Drawing Sheets

(56) References Cited

U.S. PATENT DOCUMENTS

| | | | |
|---|---|---|---|
| 4,982,781 A | | 1/1991 | Carpenter et al. |
| 5,002,475 A | | 3/1991 | Graefe |
| 5,035,602 A | * | 7/1991 | Johnson ................. 425/468 |
| 5,332,022 A | * | 7/1994 | Colvin ...................... 164/98 |
| 5,360,050 A | * | 11/1994 | Miyajima .................. 164/45 |
| 5,676,900 A | * | 10/1997 | Pajtas ...................... 264/251 |
| 5,735,336 A | | 4/1998 | Oti |
| 6,344,160 B1 | * | 2/2002 | Holtzberg ................ 264/102 |
| 6,481,490 B1 | | 11/2002 | Vihtelic et al. |
| 6,901,989 B1 | | 6/2005 | Sargent et al. |
| 2004/0087754 A1 | | 5/2004 | Foley et al. |

FOREIGN PATENT DOCUMENTS

| | | | | |
|---|---|---|---|---|
| JP | 03210936 A | * | 9/1991 | |
| JP | 07032411 A | * | 2/1995 | |
| JP | 08207078 A | * | 8/1996 | |

\* cited by examiner

Test Block Dimensional Analysis

1

FOAM PATTERNS

CROSS REFERENCE TO RELATED APPLICATIONS

This application is a continuation-in-part of U.S. application Ser. No. 12/167,546 filed Jul. 3, 2008 now U.S. Pat. No. 7,958,932 entitled "Casting Materials", the entirety of which is incorporated herein by reference. This application also claims the benefit of U.S. Provisional Patent Application Ser. No. 60/947,941 filed Jul. 3, 2007, the disclosure of which is hereby incorporated by reference.

STATEMENT REGARDING FEDERALLY SPONSORED RESEARCH OR DEVELOPMENT

This invention was made with government support under Contracts No. FA8650-05-M-5304 and No. FA8650-06-C-5300 awarded by U.S. Air Force and Contract No. DE-FC36-04GO14332 awarded by the Department of Energy. The Government has certain rights in this invention.

BACKGROUND OF THE INVENTION

The present invention relates to casting processes for the manufacture of metal and alloy structures, and more particularly, to systems, methods and materials associated with fugitive patterns used for casting operations.

Investment casting, which is also commonly known as the lost wax process, is one of the oldest known techniques utilized for forming metal. In practice, a wax substance is patterned, such as by injecting melted wax into a die. When the wax cools, it solidifies in a pattern that corresponds to the component to be cast in metal. The molded wax pattern then is invested in a ceramic shell mold, such as by repeatedly dipping the wax pattern in a ceramic slurry until a desired thickness of ceramic material is built-up on the wax pattern. The shell mold is initially heated to remove the molded wax pattern and is then fired at an elevated temperature to develop appropriate mold strength for casting a molten metal or alloy.

There are several major limitations and potential problems with using wax to manufacture investment castings, especially when it comes to certain components, such as highly complex castings, large castings and/or castings with relatively thin cross-sections. For example, the dimensional accuracy of a part manufactured using a conventional investment casting process is limited due to the inherent distortion of the pattern that occurs in the processing of wax. Moreover, wax must be handled at room temperature or lower to prevent undesired wax characteristics and/or defects, such as shape distortion, fingerprints, creep, etc. Still further, conventional wax costs are relatively high due to the requirement of initial melt cycle(s) necessary to melt the wax prior to injecting the wax into a corresponding die. Cost is further increased due to the relatively high scrap rates, which typically result due to metal leakage from shell mold cracks caused by wax expansion. Cost is also increased due to defects that lead to inclusions in the molten metal caused by ash content from wax reacting with the shell material.

BRIEF SUMMARY OF THE INVENTION

According to aspects of the present invention, a method of creating a foam pattern comprises mixing a polyol component and an isocyanate component to form a liquid mixture. The method further comprises placing a temporary core in a cavity of a mold, where the core has a shape corresponding to a desired internal feature of a foam pattern to be created, and inserting the mixture into the cavity of the mold such that the mixture flows into the cavity and surrounds a portion of the temporary core. The method further comprises waiting for a predetermined time sufficient for a reaction from the mixture to form a foam pattern structure within the mold that corresponds to the shape of the cavity of the mold, wherein the foam pattern structure encloses a portion of the temporary core. Still further, the method comprises removing the foam pattern structure from the mold, and removing the temporary core from the foam pattern structure independent of chemical leaching, such that the resulting foam pattern structure has the desired internal feature.

In an illustrative example, the temporary core comprises a low-melting point wax core. In this regard, the mixture of the polyol component and isocyanate component is formulated such that the resulting foam pattern structure exhibits a characteristic wherein the foam pattern structure will not distort at a temperature within a range necessary to cause the low-melting point wax core to melt. Accordingly, removing the temporary core comprises applying heat to the foam pattern structure sufficient to melt the temporary core out of the foam pattern structure without causing distortion of the foam pattern structure.

According to further aspects of the present invention, a method of creating a foam pattern comprises mixing a polyol component and an isocyanate component to form a liquid mixture and using the mixture to form at least one expendable foam support structure. The method also comprises placing at least one expendable foam support structure in a cavity of a mold and placing a temporary core in the cavity of the mold so as to be at least partially suspended from the cavity walls by at least one expendable foam support structure. Still further, the method comprises inserting the mixture into the cavity of the mold so that the mixture flows into the cavity and surrounds at least a portion of the temporary core and surrounds around at least a portion of each inserted expendable foam support structure. The method additionally comprises waiting for a predetermined time sufficient for a reaction from the mixture to form a foam pattern structure within the mold corresponding to the shape of the cavity, wherein the foam pattern structure encloses at least a portion of the temporary core and integrates each expendable foam support structure into the foam pattern structure. Also, the method comprises removing the foam pattern structure from the mold and removing the temporary core from the foam pattern structure independent of chemical leaching.

DETAILED DESCRIPTION OF THE INVENTION

In the following detailed description, reference is made to the accompanying drawings that form a part hereof, and in which is shown by way of illustration, and not by way of limitation, specific embodiments in which the invention may be practiced. It is to be understood that other embodiments may be utilized and that changes may be made without departing from the spirit and scope of the present invention.

The present invention provides systems, methods and materials associated with creating fugitive patterns and casting using fugitive patterns, such as for casting of metals or alloys.

According to an aspect of the present invention, a pattern for use in making a shell mold comprises a thermosetting polyurethane foam material specifically formulated for investment casting applications that is shaped to correspond to the cast article or component to be made. The foam material pattern is be shaped using any number of molding techniques as will be described in greater detail below.

Figure 1:
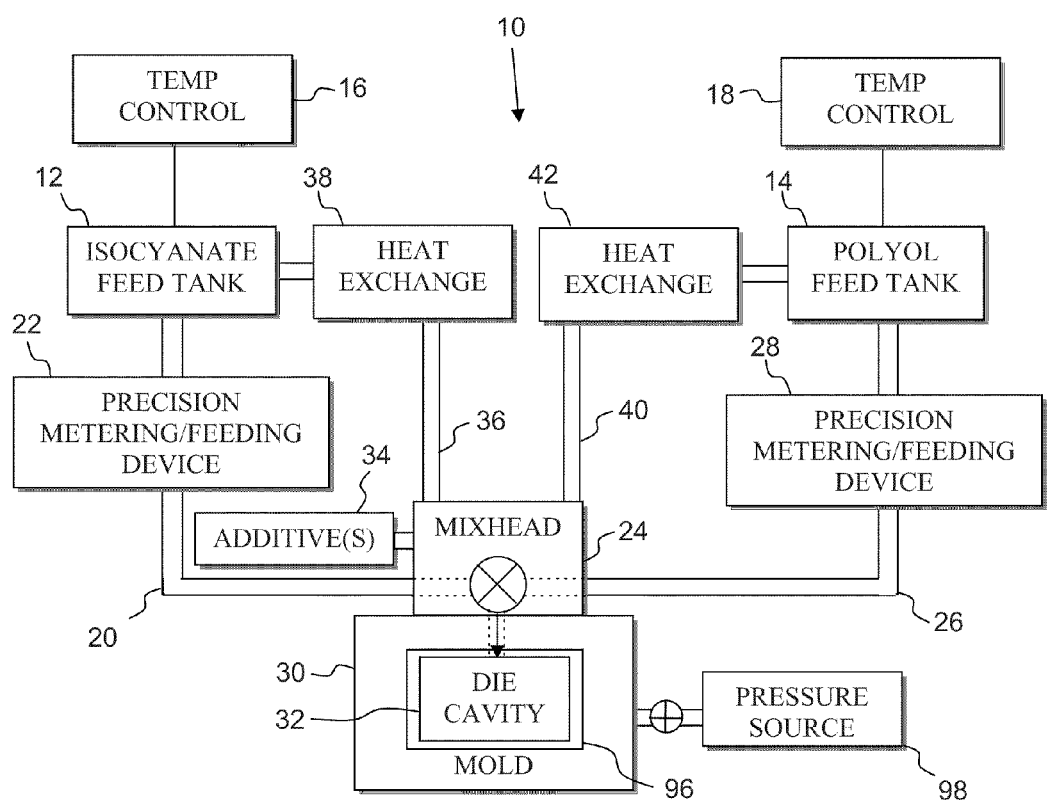
FIG. 1 is a block diagram of a reaction injection molding system to make foam patterns according to an aspect of the present invention.

Foam Pattern Constructed Using a Reaction Injected Molded Process:

Referring to FIG. 1, in a Reaction Injected Molded (RIM) process 10 according to various aspects of the present invention, an isocyanate component is maintained in liquid form in an isocyanate feed tank 12. Similarly, a polyol component is maintained in liquid form in a polyol feed tank 14. The isocyanate feed tank 12 and the polyol feed tank 14 are each temperature controlled, e.g. by a suitable temperature control device 16, 18 respectively.

A first supply line 20 carries a liquid isocyanate from the isocyanate feed tank 12 to a first precision metering/feeding device 22 that meters the isocyanate to a mixhead device 24. The first precision metering/feeding device 22 comprises for example, a recirculation pump for controlling or otherwise assisting with the flow pressure of isocynate. Similarly, a second supply line 26 carries liquid polyol from the polyol feed tank 14 to a second precision metering/feeding device 28 that meters the polyol to the mixhead device 24. The second precision metering/feeding device 28 similarly comprises for example, a recirculation pump for controlling or otherwise assisting with the flow pressure of the polyol. The isocyanate and polyol enter a chamber within the mixhead 24 at high pressure where they are mixed before being injected into a corresponding mold 30 having die cavity 32 shaped to correspond to the desired pattern shape. Other additives 34 can also be included. For instance, as illustrated, additives are mixed into the mixture of the polyol component and isocyanate component. Alternatively, such additives can be added to the polyol component, the isocyanate component or both. The additives can comprise, for instance, a reaction agent, skin forming agent and/or other components that will be described in greater detail herein.

Once inside the mold 30, the mixed isocyanate and polyol undergo an exothermic chemical reaction that forms a molded polyurethane foam pattern within the die cavity 32 of the mold 30. A first return line 36 returns unused isocyanate from the mixhead 24 to the isocyanate feed tank 12, e.g., through a first heat exchanger 38 and/or other suitable devices such as an air nucleator (not shown). Similarly, a second return line 40 returns unused polyol from the mixhead 24 to the polyol feed tank 14, e.g., through a second heat exchanger 42 and/or other conventional RIM devices.

According to various aspects of the present invention, the polyol is water-based and is not solvent based as is typically used in conventional RIM formulations. The water based formulation does not create volatile organic compounds. An exemplary RIM machine for implementing the system shown in FIG. 1 comprises a model PureShot 30 from Hi-Tech Engineering of Grand Rapids Mich., U.S.A.

The molded polyurethane foam pattern is removed from the RIM mold 30. In an illustrative example, the mold 30 comprises complimentary mold halves that can be separated sufficient to eject the molded polyurethane foam pattern, e.g., by opening the mold halves and ejecting the pattern, e.g., using knockout pins or other suitable techniques. Other mold configurations can alternatively be used. The pattern is typically allowed to cool, e.g., to room temperature, after removal from the RIM mold 30 prior to shell molding operations that are used in subsequent casting operations as described in greater detail herein. The molded pattern does not typically require cleaning prior to the shell mold operations. However, the foam pattern is cleaned if desired using a conventional pattern wash, which includes a diluted citric acid in water solvent, diluted mineral spirits in a solvent, etc. The foam pattern can also be treated, e.g., to provide surface protection as will be described in greater detail herein.

The resulting molded foam pattern exhibits a film-like surface that is sufficiently smooth and continuous, e.g., free from surface-connected open pores of the polyurethane foam. Thus, the foam pattern is suitable for casting operations. The thickness of the outer surface of the foam pattern will likely depend upon processing conditions and the geometry of the corresponding pattern. However, in illustrative exemplary implementations, the skin (outer surface) is typically less than 0.001" thick.

Figure 2:
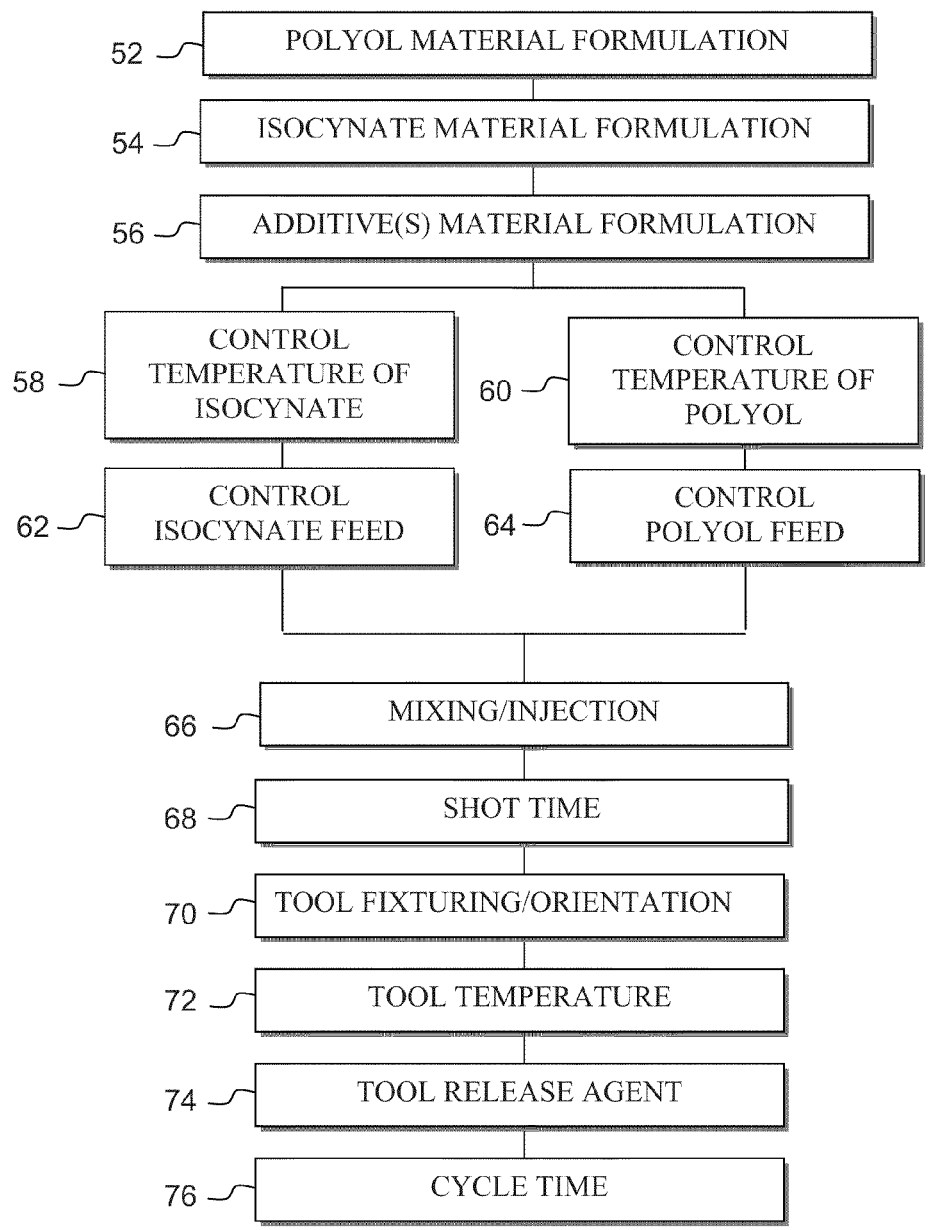
FIG. 2 is a block diagram of exemplary operational control parameters according to various aspects of the present invention.

In the exemplary RIM system shown in FIG. 1, numerous operating parameters and machine features can be controlled to achieve desired foam pattern characteristics. For example initially, foam pattern characteristics are identified/defined. Referring to FIG. 2, a block diagram illustrates foam pattern design parameters that can be controlled to achieve the desired foam pattern characteristics according to various aspects of the present invention, e.g., using RIM processes. For example, as shown at 52, the polyol component formulation is determined/controlled, e.g., based upon the predetermined foam pattern characteristics. For example, a water based polyether polyol is utilized. Alternatively, polyether polyols having different molecular weights are combined to achieve desired results. Similarly, at 54, the isocyanate component formulation is determined/controlled e.g., based upon the predetermined foam pattern characteristics. For example, in an illustrative implementation, the isocyanate material comprises a diisocyanate that is mixed as necessary to provide a desired isocyanate index.

The polyol and isocyanate material formulations affect pattern formation and density and as such, the particular formulation may depend upon the desired foam pattern requirements, as noted above. Additionally, any necessary additive material formulations are determined at 56, which are to be added to the mixture, e.g., to control blowing reaction, cross-linking and gelling. Exemplary additive materials comprise, for example, accelerant(s), catalyst(s), blowing agent(s), skin-forming additive(s), chain extender(s), water, surfactant, tertiary amine catalyst(s) and amine catalyst(s), etc. Additive component formulations can be determined/controlled based upon the predetermined foam pattern characteristics such that their addition to the mixture affects, for example, reaction rates, cycle times, and the density of pattern.

In addition to determining the mixture material formulations, numerous process parameters are optionally controlled and adjusted to achieve desired foam pattern characteristics. For example, as shown at 58, the temperature of the isocyanate component (prepared according to the isocyanate component formulation) is controlled. Similarly, at 60, the temperature of the polyol component (prepared according to the polyol component formulation) is controlled. Temperature control of the polyol and isocyanate formulations affects reaction rates and cycle times. Additional process control parameters include the isocyanate feed at 62 and polyol feed at 64, which affect pour time or injection rates. Still further, process control parameters such as the mixing/injection characteristics at 66, which affects mixing rates and formation of solution of liquids and thus material consistency, and the shot or material injection time 68, i.e., the time utilized to inject the isocyanate and polyol into the mixhead can also be controlled. The shot time affects pattern density and surface characteristics. Still further, the tool fixturing/orientation is controlled at 70, which affects pattern quality such as dimensions, surface and consistency. As such, the mix rate of the polyol component, the isocyanate component and at least one additive component is controlled to form a mixture, which is inserted into the corresponding mold.

The tooling temperature is controlled at 72, which affects pattern density and quality, and the tooling release agent is selected/determined or otherwise controlled at 74, which affects pattern surface quality and manufacturability. Yet further, the cycle time, i.e., time needed for the mixture to fully react in the mold to form the foam pattern can be controlled at 76, which affects pattern manufacturability and pattern production cost. Where applicable, other design parameters include tool design, tool venting, and other parameters which may be necessary to control to achieve desired foam pattern characteristics.

By way of illustration and not by way of limitation of some exemplary operating parameters according to various aspects of the present invention, the isocyanate and polyol are injected into the mixhead at a pressure within the range of approximately 1,800 pounds per square inch (psi) to approximately 2,000 psi. Additionally, the flow rates of the isocyanate stream and polyol stream are adjusted in an operating range of approximately 6 pounds per minute (lbs/min) to approximately 30 lbs/min. The mixture of material is injected into the mold, for example, in a time range of approximately 0.2 seconds to approximately 3 seconds. Process time in the mold is adjusted, for example, within a range of approximately 1 minute to approximately 6 minutes. Still further, the temperature of the isocyanate stream in an illustrative example, ranges from approximately 85 degrees Fahrenheit (approximately 30 degrees Celsius) to approximately 110 degrees Fahrenheit (approximately 43 degrees Celsius). Similarly, the temperature of the polyol stream ranges, for example, from approximately 85 degrees Fahrenheit (approximately 30 degrees Celsius) to approximately 110 degrees Fahrenheit (approximately 43 degrees Celsius).

Additionally, the temperature of the mold 30, e.g., the temperature of the mold halves can be optionally controlled. As noted above, the mixture causes an exothermic reaction in the mold, which produces heat. However, controlled preheating of the mold can assist the reaction, e.g., to affect the formation of a suitable skin, to influence the overall density of the foam pattern, etc. As an illustrative example, the tooling, e.g., the mold cavity is pre-heated to a range from approximately 100 degrees Fahrenheit (approximately 38 degrees Celsius) to approximately 140 degrees Fahrenheit (approximately 60 degrees Celsius) for molding operations to create the foam patterns. The above ranges are illustrative and other ranges may be utilized, e.g., based upon pattern dimensions and specific pattern requirements.

According to various aspects of the present invention, the surface finish of the mold 30, e.g., the surface finish of the mold halves and in particular, the surface of the die cavity 32, can be chosen to impart a desired finish to the outer surface of the foam pattern and thus may affect the surface finish of a corresponding shell mold and casting as part of the complete investment casting process. The surface finish of the mold 30 can thus be tailored to the desired surface finish of the casting to be made in a corresponding shell mold.

Figure 3:
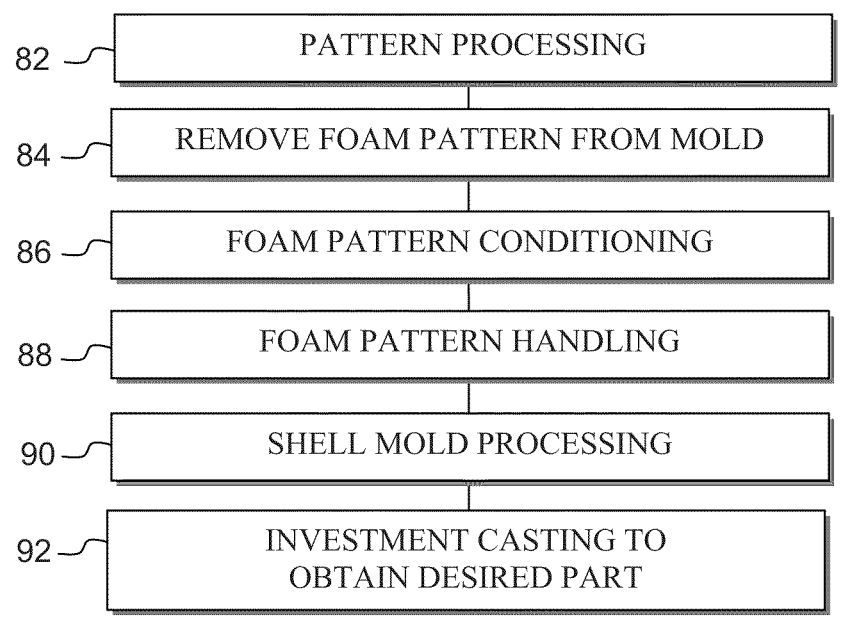
FIG. 3 is a flow chart illustrating an investment casting lifecycle according to various aspects of the present invention.

Referring to FIG. 3, according to various aspects of the present invention, a lifecycle 80 illustrates an overview of the investment casting process according to various aspects of the present invention. Initially, a foam pattern is created at 82. For example, the foam pattern is created by heating a polyol component, e.g., a liquid polymer, to a predetermined temperature, heating an isocyanate component to a predetermined temperature and mixing the polyol component and the isocyanate component, e.g., at a high velocity, to form a liquid mixture. The method optionally comprises adding a reaction agent to the mixture that accelerates the reaction of the polyol component and the isocyanate component and adding a skin forming agent to the mixture.

The foam pattern is further created by coating a mold cavity of a mold with a heat activated release agent, inserting the mixture into the mold cavity of the mold for a predetermined time sufficient for a reaction from the mixture of the polyol component and the isocyanate component to form a foam pattern structure having a shape that corresponds to the inside surface configuration of the mold cavity and controlling the temperature of the mold to achieve a foam pattern.

In this regard, the mixture is inserted into the mold cavity by pouring, e.g., hand pouring, as will be described in greater detail herein, by injecting, e.g., using a RIM molding process as set out in greater detail herein with reference to FIGS. 1 and 2, or otherwise depositing the mixture into the mold.

Once the reaction is complete, e.g., typically within a few minutes, the foam pattern is removed from the mold. The resulting foam pattern comprises a shape that corresponds to the inside surface configuration of the mold cavity and an outer surface that is free of porosity. The resulting pattern, in an illustrative example, has an aggregate pattern density in the range of about 3 to 20 lbs/ft$^3$ (pounds per cubic feet) and may typically realize an aggregate density in the range of 4 to 8 lbs/ft$^3$, although other density ranges may be utilized depending upon the specific application.

Once the foam pattern has been formed, it is removed from the mold at 84. The foam pattern is allowed to cool, e.g., to room temperature. Depending upon the application, optional foam pattern conditioning is applied at 86. As an illustrative example, it may be desirable to perform surface conditioning of the foam pattern, such as by spraying the surface of the foam pattern with a wax spray. The wax spray, where utilized, ensures the surface of the foam pattern is sealed and is water tight before the foam pattern is handled, e.g., before the foam pattern goes to a foundry for shell building and casting. As an illustrative example, according to aspects of the present invention, the foam pattern comprises a thermally collapsible polyurethane foam pattern having a shape corresponding to the casting to be made.

Moreover, the foam pattern exhibits a pattern skin, i.e., the skin surrounding the low density foam pattern, which is continuous without being too thick. The pattern skin is controlled by controlling the pattern density, tool temperature, material temperature, etc., as set out in greater detail herein. According to various aspects of the present invention, the processing parameters discussed herein are controlled to realize the lowest density rigid foam that would provide a suitable skin for the intended application.

The foam pattern is handled at 88. For example, as will be described in greater detail herein, the foam pattern created according to various aspects of the present invention is stable and thus may be readily transported and/or otherwise stored or handled before continuing the process. Keeping with the above-example, the dimensional stability of the resulting pattern enables the pattern to be stored for extended periods of time and shipped or otherwise transported using commercial means.

The foam pattern is utilized at a subsequent process for use in making a shell mold for casting operations at 90, e.g., by a foundry process that creates the corresponding molded parts. When the shell molding process completes, a shell mold is created that is suitable for investment casting to obtain a desired part at 92. Again, in furtherance of the above example, despite the relatively low density of the thermally collapsible polyurethane foam pattern, the foam pattern exhibits sufficient stiffness, rigidity and smooth surface characteristics to be invested in a shell mold without significant damage to the pattern.

As an illustrative example, the foam pattern created at 82 is utilized by a foundry to dip into a ceramic slurry to form a casting mold around the foam pattern. The skin or surface of the foam pattern should be continuous, unbroken, etc., so that the water/ceramic slurry can not penetrate the pattern surface, thus avoiding fabrication problems such as shell cracking and/or preventing other defects in the cast metal or metal alloy components in future processes using the shell mold. Once a sufficient thickness of ceramic material is built up on the foam pattern, the shell mold is heated to burn out the foam pattern. The formulation and density of the foam pattern is configured so that the shell mold does not crack during the removal of the foam pattern. Moreover, the foam pattern material burns out cleanly, leaving no significant ash residue in the shell mold which can contaminate the molten metal or alloy which is poured in the shell to make the casting during subsequent processing.

According to various aspects of the present invention, the polyol material formulation, the isocynate material formulation, optional additive(s) material formulation and the above-described process parameters are controlled so as to realize, e.g., as described with reference to FIGS. 1 and 2, a self-skinning, thermosetting rigid polyurethane foam pattern that is thermally collapsible. The density range of the foam pattern can optionally be adjusted, e.g., using the operational parameters set out above, to achieve foam patterns that have good, e.g., continuous, consistent, unbroken skin (surface characteristics) with minimal material overall, i.e. low density. According to various aspects of the present invention, there may be a range of optimum density depending on the geometry, complexity, wall thickness, etc., of the resulting foam pattern. This range may comprise, for example, approximately 3 to 20 lbs/ft$^3$. Relatively higher density may be required, for example, for relatively thin walled pattern geometries and lower density may be utilized, for example, for most other foam pattern geometries that do not have a lot of thin walls.

The foam pattern according to various aspects of the present invention, provides stiffness and/or rigidity sufficient to be invested in a shell mold without damage to the pattern or mold and allows for the replication of complex features. In this regard, the foam pattern are formulated, e.g., based upon manipulation of the above-described parameters, to have a sufficiently smooth continuous solid surface to avoid significant defects in the resulting cast metal or alloy components. In an exemplary implementation, the foam pattern volume comprises 85-95% air and the remainder volume comprises the polyurethane structurally rigid foam made up of an interconnected cellular structure. The skin/surface is smooth and is less than 0.001" thick in some applications. Other percentages of air and/or polyurethane can alternatively be formulated. Also, the thickness of the skin surface can be different from the example given.

In an illustrative example, the mixture of isocyanate and polyol optionally includes selected additives, e.g., which are added to the polyol stream or are otherwise provided in the polyol component. Additives may include, for example, accelerators, catalysts, etc., which accelerate the reaction of the isocyanate and polyol to the foam composition to reduce cycle times. Other exemplary additives may comprise skin-forming additives such as diamine, chain extenders to promote hard segment concentration in the pattern resulting in more rigid or stiff foam structure and water blowing agents to control free rise density of the foam pattern. In this regard, the free rise density comprises an exemplary parameter that may be configured for controlling pattern density.

Other additives may also be included in the mixture, depending for example, upon intended pattern characteristics. For example, in illustrative implementations as noted above, a catalyst is added to the mixture of isocyanate and polyol (or to the polyol component or isocyanate component) to accelerate a foaming reaction of the mixture, which results in faster cycle times in production which lowers manufacturing costs and thus makes the production process more competitive and easier to commercialize.

The foam pattern constituents can also comprise materials similar to the polyurethane that is set out in U.S. Pat. No. 6,481,490, issued Nov. 19, 2002 to Vihtelic et al., which is hereby incorporated by reference in its entirety. In this regard, the constituents disclosed therein may be utilized in conjunction with various aspects of the present invention to manufacture foam patterns using the techniques, mixtures and operational parameters as set out in greater detail herein.

In general, molds capable of RIM processing are conventionally made of steel or aluminum due to the typical temperature requirements and processing conditions of wax molding. However, according to aspects of the present invention, e.g., as set out at box 70 in FIG. 2, tool fixturing is a parameter that can be adjusted or varied depending upon the desired foam pattern to be realized. By controlling operating parameters and the selection of additives into the isocyanate stream, polyol stream or mixture thereof according to various aspects of the present invention as set out in greater detail herein, relatively cheaper mold cavities may be utilized, e.g., constructed from rubber, plastics, composites, etc.

Figure 4:
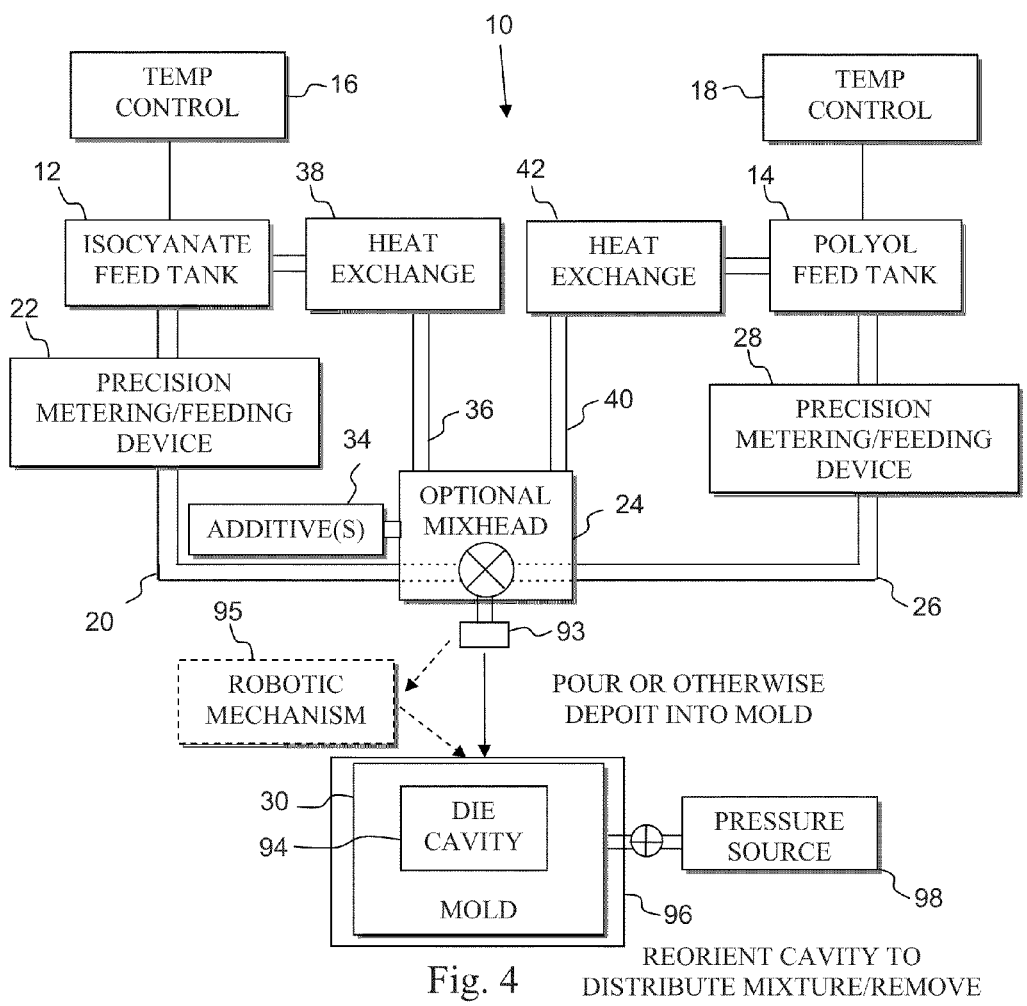
FIG. 4 is a block diagram of a reaction injection molding system to make foam patterns according to further aspects of the present invention.

Referring to FIG. 4, another system is illustrated, which is similar to that described with reference to FIG. 1. As such, like structure is illustrated with like reference numerals. Moreover, the discussion of the system with reference to FIG. 1 applies to the system of FIG. 4 except where noted herein. According to various aspects of the present invention, the foam pattern composition described herein enables the use of numerous and flexible tool fixturing/configurations. As an illustrative example, there is no requirement to inject the foam pattern mixture into an aluminum or steel closed mold. Rather, in illustrative examples, the mixture from the mixhead 24 is stored to a suitable storage 93, which facilitates the ability to pour the mixture, e.g., by hand, into a corresponding mold. In yet another exemplary implementation, the system allows hand mixing of all or part of the constituents of the mixture in lieu of, or in cooperation with the mixhead 24. In still a further exemplary implementation, a robotic component mixes and/or pours the mixture into the mold, e.g., via a suitable robotic mechanism 95. Depending upon the application, such hand or robotically poured techniques may lower tooling cost, simplify processing and/or offer manufacturing flexibility. Thus, as an illustrative example, the foam pattern mixture according to various aspects of the present invention is either poured or injected into low cost tooling, e.g., a rubber mold cavity.

As yet a further example of various aspects of the present invention, the foam pattern mixture described more fully herein enables the use of "open" molding techniques as an alternative to or in addition to the use of "closed" molding techniques. Thus, the mold 30 comprises a mold cavity 94 that is open, closed or a hybrid of open and closed. Under this arrangement, the material can be poured, e.g., a pre-mixed foam material is ported to open mold for open mold deposition. According to various aspects of the present invention the ability of the foam pattern material to be poured or injected into an open and/or closed mold allows tooling flexibility and further enables control of mold orientation, such as further set out at box 70 in FIG. 2.

In an illustrative example, the mold 30 is reoriented, e.g., adjusted/controlled, rotated or otherwise manipulated after/while inserting the mixture into the mold 30 and mold (die) cavity 32/94. Reorientation (manipulation) of the mold can be performed while the mixture is in a liquid form and/or during the reaction process (prior to said mixture forming a solid foam structure), such as by an optional structure 96. In an illustrative example, the structure 96 causes the mold cavity 94 to rotate, translate or otherwise move, e.g., along one or more axes so as to optimize pattern properties including the distribution of the mixture and thus the corresponding reacted foam pattern in the mold. As a result, the system can avoid trapping air in the mold cavity 94 that would otherwise adversely affect the characteristics of the foam pattern, etc. For example, in such implementations, the structure 96 can comprise a single or multi-axis gimbaling device or similar structure that allows the orientation of the mold or mold cavity to be manipulated, e.g., either manually or automatically. As such, mold manipulation during and after the pour and/or injection processes are facilitated. The resulting pattern finish of foam patterns using these techniques may thus be improved by including less surface voids or entrapped air bubbles.

Still further, in certain implementations, an optional pressure source 98 is used to improve operating efficiency and/or to facilitate foam pattern characteristics. In this regard, the pressure source can be either a positive pressure source or a negative pressure source. In an illustrative example, a vacuum assist is utilized to evacuate air from the mold 30 to draw the air and the reaction gases out from the mold 30 during foam pattern forming operations, thus affecting surface finish, surface quality, and overall pattern properties. Accordingly, design capabilities can now include intricate features and dimensional control of complex geometries.

In illustrative examples, a wax mold release agent, such as urethane Parfilm is applied to the injection (or pour) mold surfaces, e.g., the die mold cavity 32, 94 prior to molding the pattern to facilitate release of the foam pattern from the mold as an alternative to the typical silicone release agent. As an illustrative example, the release agent may exhibit a suitable operating range of approximately 100 degrees Fahrenheit (approximately 38 degrees Celsius) to approximately 140 degrees Fahrenheit (approximately 60 degrees Celsius). The heat activated wax-based release agent acts to release the foam pattern out of the mold easily and quickly upon application of a sufficient temperature to the mold cavity, while providing the corresponding foam pattern with a good surface skin which is compatible with the foundry shell building process described more fully herein. Moreover, the use of the wax mold release agent does not require changes to conventional wax pattern shell building process, which lowers barriers to commercialization.

Still further, the foam patterns may be formed using open or closed mold systems as an alternative to/or in combination with RIM and other injection molded systems and techniques as set out above.

Exemplary Construction of a Shell Mold:

As noted in greater detail herein, the molded foam pattern may be invested in a ceramic or refractory shell mold. For example, the molded foam pattern may be dipped in a liquid ceramic or refractory slurry. The excess slurry is drained and a stuccoing operation is performed, e.g., by dipping the foam pattern in a fine-grained sand until a desired thickness of a shell mold is built-up on the pattern pursuant to the well known "lost wax" process principles. For example, up to eight layers or more can be applied to the foam pattern in this manner. Further, a shell mold face coat and back-up layers can be built up and varied using conventional techniques, e.g., depending upon the molten metal or alloy to be cast in the shell mold.

After the shell mold is formed to a desired green (non-fired) shell mold wall thickness, the foam pattern is burned out from the shell mold, e.g., by heating the shell mold in a suitable heating device such as an oven or furnace. As an example, a suitable temperature range comprises approximately 1800-2000 degrees Fahrenheit (approximately 982 to 1100 degrees Celsius) for a time period of approximately 1 to 3 hours. After the application of a sufficient temperature for a sufficient time, the foam pattern becomes fugitive and is burned out of the mold without significantly cracking or otherwise damaging the shell mold. Moreover, no significant ash or residue remains from the foam pattern. For example, the foam pattern burns out without changing from polyurethane foam to a liquid (unlike wax which melts and expands) so as to avoid cracking the shell mold, with substantially no residue, e.g., burn out ash, left in the shell mold as a result of pattern decomposition.

Further, additional optional processing, such as subjecting the shell and foam pattern to an optional isostatic gas pressure treatment at elevated gas (e.g. air) pressure and temperature prior to the pattern burnout operation, or other suitable techniques may be employed.

Following removal of the foam pattern, the shell mold may be conventionally preheated or fired at elevated temperature suited to the particular ceramic or refractory used to fabricate the shell mold in order to develop adequate shell mold strength for casting of the molten metal or alloy therein.

Foam Pattern Characteristics:

According to various aspects of the present invention, a foam patterned material is provided which may be used as a substitute for wax in the lost wax process utilized to make investment cast parts. The foam pattern material comprises a multi-component foam which offers potential savings, e.g., in terms of energy, reduced cost of manufacturing etc., thus extending design capabilities of investment cast parts.

According to various aspects of the present invention, the foam pattern material exhibits minimal pattern dimensional changes during processing, resulting in a stable pattern compared to conventional lost wax alternatives. For example, foam patterns according to various aspects of the present invention exhibit as much as approximately $\frac{1}{20}^{th}$ or less of the dimensional variability compared to conventional wax counterparts, e.g., based on mold versus pattern dimensions. In an exemplary foam pattern, the material did not show shrinkage as commonly seen in wax. The foam pattern did exhibit a slight expansion from 0.07% to 0.13%. A comparative wax pattern typically exhibits shrinkage of approximately 0.6% to 0.8%.

Further, because the foam patterned material exhibits little or no pattern variation, there is a reduced likelihood of shell cracking during the process of preparing the shell mold. Also, the rigid characteristics of the foam pattern results in a durable material that exhibits good handling and dimensional stability. This enables patterns to be created, and then shipped, stored or otherwise maintained for extended periods of time. Moreover, the dimensional stability exhibited by foam patterns according to various aspects of the present invention, and correspondingly, the ability to realize extended shelf life of such foam patterns are further facilitated by significantly increased durability and resistance to temperature and other environmental conditions, including dynamic conditions, which are associated with the storage, packaging, handling etc. of foam patterns. Comparatively, conventional wax patterns have a relatively short life and are easily damaged or deformed, e.g., via wax creep.

As such, patterns can be centrally produced and shipped to appropriate foundries. Thus, the foam patterns according to various aspects of the present invention facilitate pattern making, which may be outsourced as an alternative to requiring in-house pattern making. That is, buyers of castings are no longer required to have the foundry make the pattern and the casting. As such, a buyer may purchase foam patterns from a first source and ship them to one or more foundries of choice for shell molding and subsequent casting.

According to various aspects of the present invention the foam pattern material has a relatively lower density than previous lost wax or other polymer pattern materials. The lower density improves manufacturing cycle times and low pressure injection allows alternate tooling and materials to be used. For an example, the addition of activators and accelerants to the foam material allows the formation of a foam pattern having a low density, e.g., within the range of approximately 3 to 12 lbs/ft$^3$, resulting in a more robust pattern material at relatively quick cycle times and short injection times. Also, the foam pattern material provides relatively quicker pattern fabrication and lower cost tooling than that required for conventional lost wax processes, e.g., by enabling alternative molding techniques as described herein, e.g., pour molding, vacuum assist molding etc., as well as alternative tooling to be used compared with conventional techniques, e.g., rubber molds compared to conventional aluminum or steel molds.

Additionally, the foam patterns according to various aspects of the present invention, meet Environmental Protection Agency standards. For example, the fugitive pattern decomposition is environmentally friendly. Burn test results are as follows:

Gas Testing:

Tests conducted according to AITM 3.0005 show under the Flaming and Non-Flaming conditions gas levels well below the max accepted levels. The average concentration (in parts per million, ppm) of the following gas components of smoke did not exceed the limits listed in the table below:

Limiting values as specified in the ABD 00031

| | |
|---|---|
| Hydrogen Fluoride HF | 100 ppm vol |
| Hydrogen Chloride HCI | 150 ppm vol |
| Hydrogen Cyanide HCN | 150 ppm vol |
| Sulfur Dioxide SO2/H2S | 100 ppm vol |
| Nitrous Gases NO/NO | 100 ppm vol |
| Carbon Monoxide CO | 1000 ppm vol |

According to various aspects of the present invention, the relatively lower density of the foam pattern material can enable the use of the foam pattern for other casting technologies. For example, in the Antioch process, which is a subset of plaster molding, the foam material may be heated to a point of shriveling. When it becomes a gel it is removed from the mold. This is an alternative to an investment casting, where the foam material is burned out of the pattern. Other exemplary casting processes that may benefit from the use of a foam pattern comprise the Shaw Process, investment casting, lost foam casting, plaster molding, sand casting and other casting processes.

According to additional aspects of the present invention the foam patterned material is readily reworked or retooled. For example if the surface of a foam pattern described herein is broken and the cells are exposed, the pattern can be repaired with wax or other suitable materials.

Figure 5:
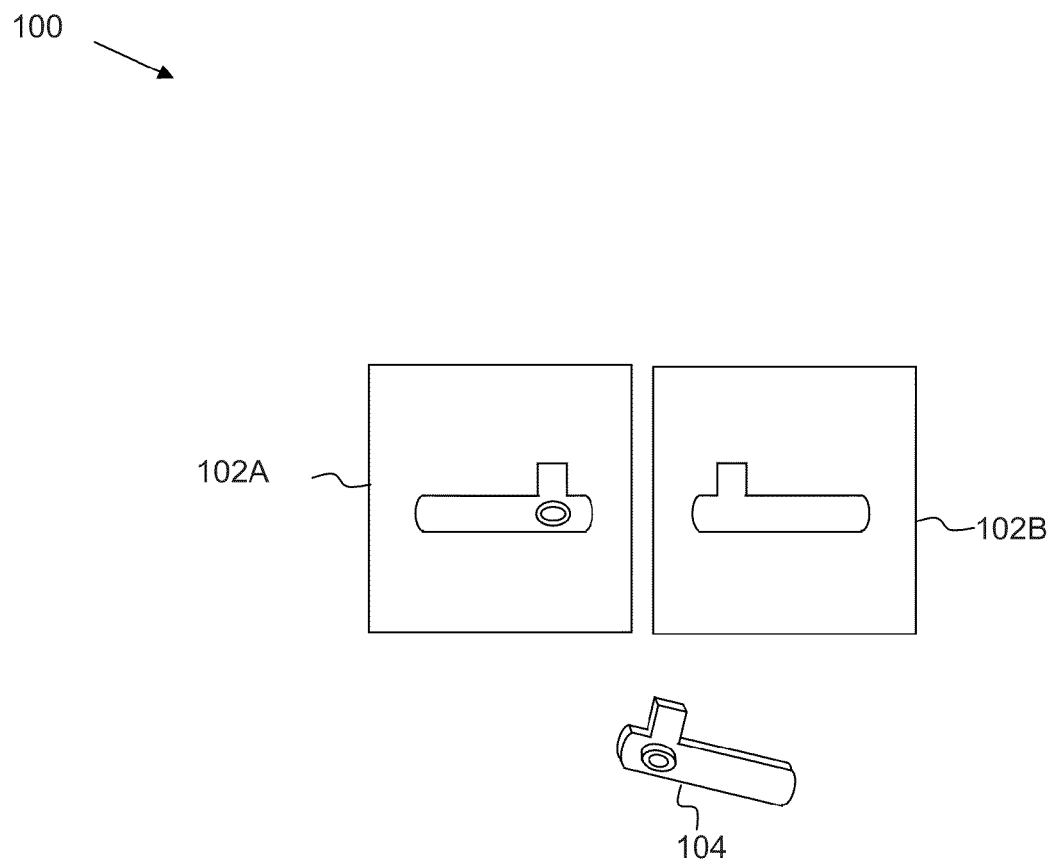
FIG. 5 is an illustration of a two-part mold cavity and a corresponding foam pattern made therein, according to various aspects of the present invention.

Referring to FIG. 5, an exemplary two-part mold 100 (also referred to as a die) is illustrated. The two part mold 100 comprises a first clamshell half 102A and a second clamshell half 102B. The first clamshell half 102A and second clamshell half 102B each have a die cavity that collectively corresponds to the shape of the desired three dimensional foam pattern 104 (shown as a complete, molded part). The second clamshell half 102B mates with the first clamshell half during molding operations, e.g., as part of the mold 30 shown in FIGS. 1 and 3, for example. Typical wax patterns having a small but thicker die usually require a chill prior to the injection process for proper wax injection patterning. This is done to minimize the "wax sink" that occurs when a heavy section of wax is cooling during solidification. However, the foam pattern 104 according to various aspects of the present invention set out in greater detail herein, eliminates adverse injection effects such as sink, thus eliminating the chill operation, making the resulting operation more efficient—providing for a better first time yield for dimensions and a less costly and less time consuming pattern injection compared to conventional wax processing.

According to aspects of the present invention, the foam pattern is also suitable for casting thin sections, e.g., as may be required by applications such as an airfoil. For example, a generic airfoil die may be constructed, e.g., in epoxy from a prior wax pattern, thus illustrating the versatility of the foam pattern process to easily inject long thin sections in less expensive epoxy dies compared to machined aluminum dies used in the current wax process. In an exemplary airfoil, the thinnest section of the airfoil is a 0.030" trailing edge and the main airfoil body only has a 0.100" thickness over a part that measures 8-9 inches in length.

Figure 6:
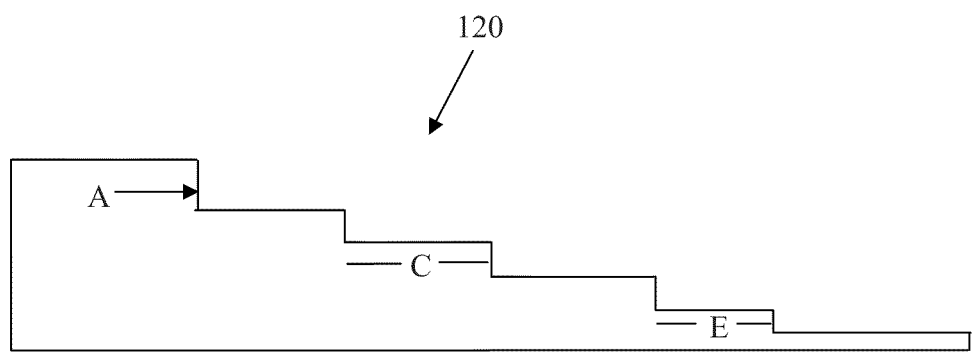
FIG. 6 is an illustration of a test block foam pattern to illustrate the dimensional stability of foam patterns created using techniques set out more fully herein.

Referring to FIG. 6, three test foam step blocks 120 were manufactured from a step block die (not shown), which has several different thickness sections or steps. The formation of the pattern ranges in thickness, e.g., from 1" down to 0.050" as shown in the table below. Measurements of the three samples made from the step block die are shown in Table 1 below:

TABLE 1

All dimensions in inches

| Die | Dimension 1 | Dimension 2 | Dimension 3 | Dimension 4 | Dimension 5 |
|---|---|---|---|---|---|
| Step Block Die | 0.200/0.201 | 0.066/0.067 | 1.016/1.018 | 1.014/1.015 | 4.060/4.064 |
| Step Block Pattern #1 | 0.198/0.196 | — | 1.025/1.028 | 1.028/1.30 | 4.035/4.040 |
| Step Block Pattern #2 | | 0.68/0.69 | 1.025/1.026 | 1.025/1.026 | 4.103/4.105 |
| Step Block Pattern #3 | 0.202/0.203 | 0.065/0.66 | 1.025/1025 | 1.026/1.028 | 4.104/4.106 |

Length—The length of a foam pattern test block pattern was measured at various points as shown at Points A, C, and E on the three injected pattern instances.

The dimensions were measured with a standard caliper and are shown as follows:

| | Length in Inches | | | |
|---|---|---|---|---|
| | A | C | E | Total Length |
| DIE DIMENSIONS | 1.000 | 1.000 | 1.000 | 6.001 |
| Pattern #1 | 1.003 | 1.001 | 1.002 | 6.003 |
| | 1.002 | 1.001 | 1.001 | 6.002 |
| Pattern #2 | 1.002 | 1.002 | 1.001 | 6.004 |
| | 1.002 | 1.001 | 1.001 | 6.005 |
| Pattern #3 | 1.001 | 1.001 | 1.001 | 6.004 |
| | 1.001 | 1.001 | 1.002 | 6.003 |
| Average of patterns | 1.002 | 1.001 | 1.001 | 6.003 |
| Variance vs Die | 0.2% | 0.1% | 0.1% | 0.03% |

Discussion of Results:

The tightness of the resulting foam patterns shows that the foam pattern material does not shrink into the die as wax does. The foam pattern material tested above exhibited a slight expansion of 0.1% to 0.2%, compared to wax, where the wax may exhibit a shrinkage, e.g., in a range of approximately 0.6% to 1.1%. Moreover, the slight expansion of the foam pattern material results in a smaller percentage of change from the actual die dimensions compared to wax. Thus, the foam patterns, e.g., as utilized in the exemplary tests, seem to display about one-fifth the variation of that observed in wax for similar size dimensions. This smaller dimensional change/variation allows for closer dimensional control of final castings and allow for designers to calculate weight on a tighter tolerance part, thereby saving weight in the parts cast. Even a tolerance that is 0.001 or 0.002 tighter may save many pounds over a large frame. Still further, air entrapment in conventional wax patterns and related defects on the surface of conventional wax patterns can result in significant problems including imprecision, waste, potentially defective part production, etc. Comparatively, the foam patterns according to various aspects of the present invention have a smooth skin and thus avoid the problems related to surface defects in conventional wax patterns, resulting in higher yield, less waste, improved quality control, etc.

According to various aspects of the present invention the foam pattern described in greater detail herein provides increased dimensional accuracy and increased temperature stability. For example, the foam patterned material exhibits insignificant pattern shrinkage which results in a stable pattern that can withstand significant temperatures, e.g., up to and potentially in excess of 200 degrees Fahrenheit (approximately 93 degrees Celsius) without distortion. As such, the foam pattern according to various aspects of the present invention thus avoids potential problems otherwise realized with unstable waxes due to melting and solidification, shrinkage adjustments, wax expansion characteristics due to temperature, etc. The foam pattern materials according to the various aspects of the present invention also provide comparable or lower cost per pattern compared to conventional wax pattern materials.

The foam pattern also consumes less energy per pattern compared to conventional wax pattern processes. Correspondingly, less energy is required to produce foam patterns according to various aspects of the present invention as set out more fully herein, compared to conventional wax patterns. Moreover, due to the dimensional stability, light weight characteristic and robustness of the foam patterns set out herein, a significant shelf life may be realized. Still further, the foam patterns can be handled, stored etc., with significantly less risk of damage compared to conventional wax patterns. Moreover, due to the improved dimensional stability, the foam patterns yield tighter tolerances and less waste compared to conventional wax patterns. As such, energy conservation and cost savings are realized in not only the manufacture of the foam patterns themselves, but also in the handling of the patterns and in the investment casting process to obtain the desired produce.

Moreover, in addition to savings in terms of energy, foam patterns manufactured according to various aspects of the present invention as set out in greater detail herein, may realize overall cost savings to the manufacturer that can exceed 100% compared to conventional wax processes.

For example wax requires one or more melting cycles and a holding cycle at an elevated temperature such as 150 degrees Fahrenheit (approximately 66 degrees Celsius). However with the foam pattern, only minimal heating is required which is at near room temperature. Still further, the foam pattern according to various aspects of the present invention decreases the cost of pattern making equipment by reducing for example, the number of variables that must be controlled during the pattern making process (such as by eliminating the pre melt and melted wax hold cycles). Additionally, tooling costs are decrease with the foam pattern according to the various aspects of the present invention compared to wax patterns. For example, using traditional conventional wax patterns, a CNC machine is typically used to cut aluminum tooling and additional requirements are necessary to cool the pattern. However, using the foam pattern according to various aspects of the present invention, rubber, low cost plastic or composite molds/tooling may be used as an alternative to aluminum tooling. However, the foam patterns are compatible with conventional tooling as long as operational parameters are controlled as set out in greater detail herein.

As a few illustrative examples, foam mixtures according to various aspects of the present invention are inserted, e.g., poured, injected, etc., into lower cost, quick tooling materials such as plastic or composite tools, including those made by rapid prototyping machines including Stereolithography (SLA), silicon rubber or Room Temperature Vulcanization (RTV) tooling. Moreover, Ren-Board machined tooling (a hard polymer tool cut in a CNC machine) may be utilized to create molds for forming foam patterns created from the foam mixtures described in greater detail herein.

Additionally, the foam pattern material increases the casting yield. For example wax dimensions change and wax can cause shell cracking defects. However, the stability of the foam pattern according to various aspects of the present invention provides stable pattern dimensions and no shell cracking defects. As such, the traditional process of machining aluminum tooling, formulating the wax and providing as many as two or more melts cycles to prepare the wax, wax holding at or above a melt temperature and the injection of wax patterns into the machine and tooling can be reduced to the steps of building inexpensive tooling and then formulating and injecting the foam pattern with no significant heating requirements.

Example

For purposes of illustration and not limitation, the following example is offered. A polyurethane foam pattern comprising isocyanate, polyol and additives, e.g., as described with reference to FIGS. 1-4 above, was molded in a one step operation in a mold to have a shape of a medical hip implant. The pattern was made using the parameters of 1800 psi mix pressure, 30 lbs/min flow rate, a 0.2 second shot time and mold temperature of 130 degrees Fahrenheit (approximately 54 degrees Celsius). A mold release agent was used to facilitate the release of the foam pattern from the mold. The molded pattern had an aggregate density of about 8 lbs/ft$^3$. The pattern was invested in a ceramic shell mold using "lost wax" process techniques such that the shell mold had a wall thickness generally up to 0.5 inches thick. The mold/pattern then was heated to 1900 degrees Fahrenheit (approximately 1038 degrees Celsius) in a furnace for a time of 120 minutes to burnout the pattern with zero ash present in the shell mold and without cracking the shell mold. The shell mold then was preheated up to 1900 degrees Fahrenheit (approximately 1038 degrees Celsius) for 120 minutes to prepare for casting of a molten cobalt alloy medical hip implant. A molten metal or alloy can be cast into the fired shell mold by any conventional casting technique to form one or more cast articles which have the shape of the fugitive pattern used to make the shell mold.

Foam Patterns with Cores:

The foam pattern material according to various aspects of the present invention, eliminates the requirement for a chemical soluble core, e.g., a leachable wax which can be used as a core to create a cavity within a wax pattern. Rather, a leachable wax core is replaced with a lower melting wax to melt out of the foam pattern material independent of chemical leaching, to create a core feature such as a cavity inside the pattern. As such, no chemical bath is required for the investment cast parts, such as would conventionally be utilized when making hollow parts, etc.

Figure 7:
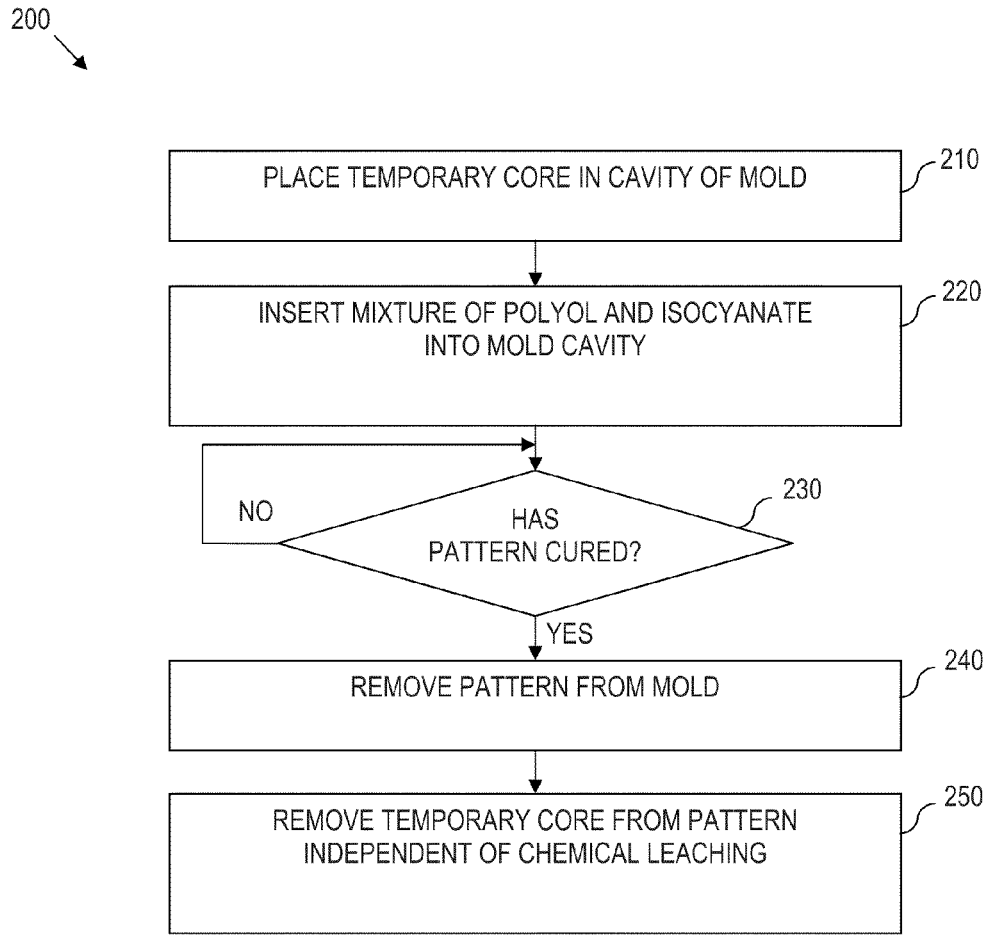
FIG. 7 is an illustration of an exemplary method of using a temporary core to create a feature in a foam pattern, according to aspects of the present invention.

Referring now to FIG. 7, a flow chart illustrates a method 200 of creating a foam pattern with an internal feature that extends to at least one surface of the foam pattern, according to various aspects of the present invention. The method 200 may be usable for example, in building a foam pattern such as a pipe, elbow or other structure having a channel, aperture, cavity, passageway or other feature, extending from the outer surface of the foam pattern at least partially into or otherwise through the foam pattern. Initially, a polyol component and an isocyanate component are mixed to form a liquid mixture as set out in greater detail herein. The mixture can be prepared using any of the techniques, formulas, compositions, methods, etc., as set out more fully herein. As mentioned above, in some embodiments the mixture further comprises additives such as, but not limited to, skin hardening agents, catalysts, other additives, or a combination thereof.

At 210, a user places a temporary core with the shape of a desired feature of a resulting foam pattern in a cavity of a mold. In certain illustrative embodiments, the temporary core is made of any suitable material that can be removed without requiring chemical leaching, such as a low-melting point wax.

At 220, the user inserts the mixture comprising polyol and isocyanate into a mold cavity of a mold corresponding to the foam pattern. The mixture flows into the cavity of the mold and surrounds a portion of the temporary core. For instance, in a hand-pouring operation, the mixture is poured into the mold so as to flow around the core within the mold, thus allowing the foam pattern to form around the temporary core. As noted in greater detail herein, in various embodiments, the user inserts the mixture by hand pouring the mixture into the mold. However, the mixture may be injected using a RIM machine, or by using other methods of inserting the mixture into the mold.

At 230, a determination is made on whether or not the pattern has cured. If the pattern has not cured, then the method 200 loops back to 230. On the other hand, if the pattern has cured, then the method 200 proceeds onto 240. Thus, the method 200 waits a predetermined time, e.g., sufficient for a reaction from the mixture to form a foam pattern structure within the mold corresponding to the shape of the cavity, wherein the foam pattern structure encloses around a portion of the temporary core.

Once the method 200 has reached 240, a user removes the cured pattern with the temporary core from the mold. The pattern can be removed from the mold using any number of suitable techniques, examples of which are described more fully herein. At 250, the temporary core is removed from the pattern without using (independent of) chemical leaching such that the resulting foam pattern structure has the desired feature.

The process for removing the temporary core depends on the materials used to make the temporary core. In certain embodiments that utilize a low-melting point wax core, the pattern (including the temporary core) is heated above the melting point temperature of the wax but below the distortion temperature of the foam pattern. Thus, the temporary core is removed from the foam pattern structure independent of chemical leaching by using heat. For example, in exemplary embodiments, a low-melting point wax has a melting point of up to 200 degrees Fahrenheit (approximately 93.3 degrees Celsius). The foam pattern does not distort or burn at such a low temperature. For example, the thermoset rigid foam pattern, as set out herein, requires a temperature in excess of approximately 300 degrees Fahrenheit (approximately 149 degrees Celsius) to begin to distort. Moreover such foam patterns burn out above approximately 1,200 degrees Fahrenheit (approximately 649 degrees Celsius).

Thus, for example, using the parameters above, a foam pattern having a temporary low melting point wax core is heated to a temperature between the melting point of the temporary core and the distortion temperature of the foam pattern, e.g., to 250 degrees Fahrenheit (approximately 121 degrees Celsius), which is between the melting point of the wax (200 degrees Fahrenheit—approximately 93.3 degrees Celsius) and the distortion temperature of the foam pattern, e.g., 300 degrees Fahrenheit (approximately 1489 degrees Celsius), in the non-limiting illustrative example. As such, the wax defining the core is melted out from the pattern, but the foam pattern remains otherwise dimensionally stable.

Notably, where the temporary core is low melting point wax, no chemical leaching is required to remove the temporary core from the foam pattern. Also, due to the temperature stability of the foam pattern, low heat will not distort the foam pattern making it suitable for use with low melting point wax. Also, due to the relatively higher density smooth skin, closed cell structure and other characteristics of the foam pattern, liquids, e.g., used to wash or otherwise clean the foam pattern, will not distort or otherwise compromise the structure of the foam pattern.

The method 200 (FIG. 7) allows for a feature, e.g., including a thin-walled feature, such as a channel, void, slot, cavity, opening, passageway, etc., to be present in a foam pattern, without using chemical leaching. Thus, various aspects of the present invention allow for the creation of a foam pattern with a feature without the use of caustic chemicals.

Figure 8:
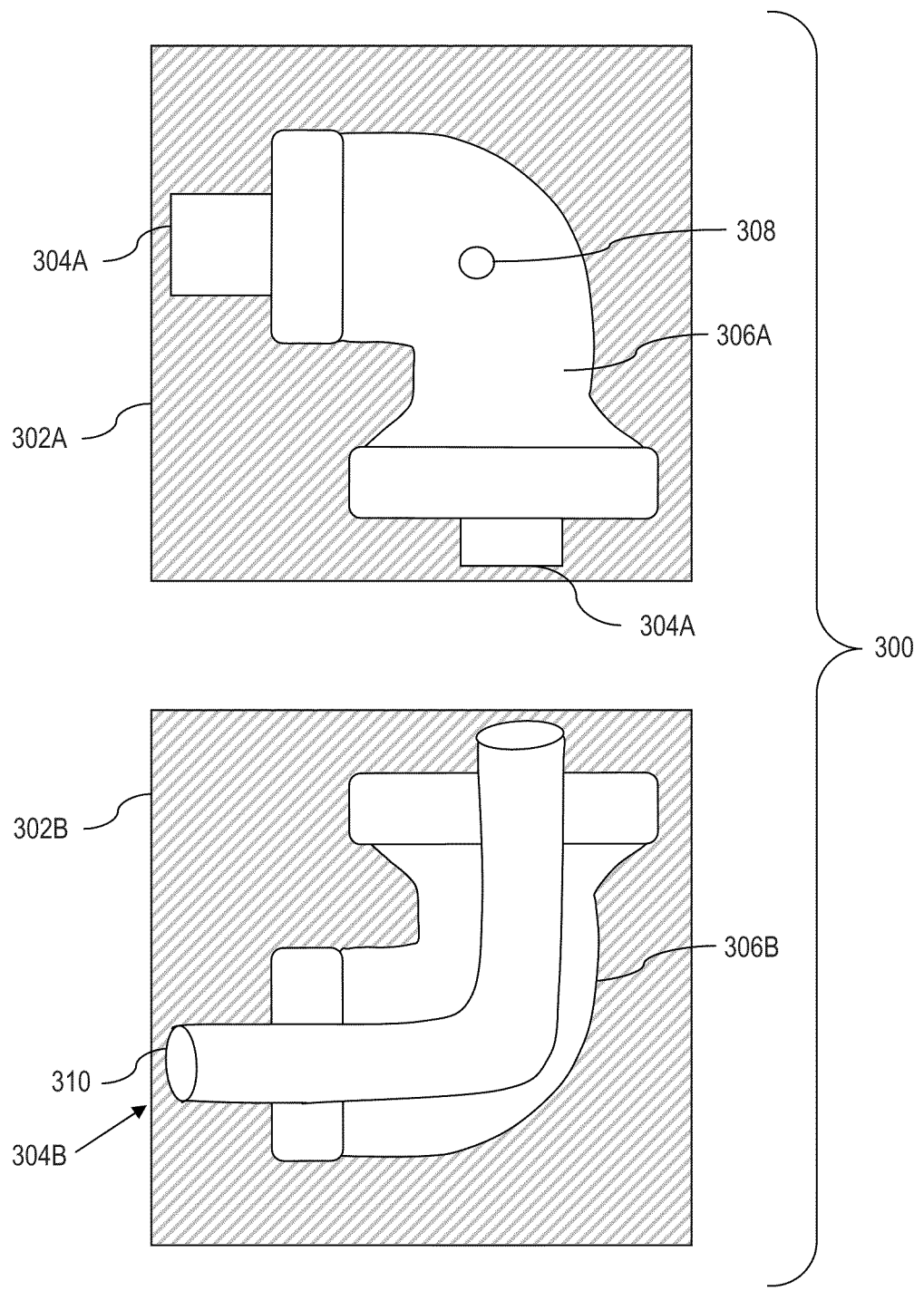
FIG. 8 is an illustration of an opened mold showing two mold halves opened up exposing the mold cavity to illustrate a temporary core inserted into the cavity before the cavity is filled with a mixture to form a foam pattern structure, according to aspects of the present invention.

Referring now to FIG. 8, a mold 300 is implemented as a clamshell mold comprising two mating halves, including a first half 302A and a second half 302B. The first and second mold halves 302A, 302B are shown opened up so that the internal cavity of each is exposed to illustrate certain aspects described more fully herein.

The first half 302A of the mold 300 includes an optional channel 304A for receiving a core print portion of a core, e.g., a temporary wax core. Similarly, the second half 302B of the mold 300 includes an optional channel 304B for receiving the core print portion of the core (described more fully herein). The first half 302 of the mold 300 also includes an internal cavity 306A. The internal cavity 306A is shaped as an impression of a bisected half of a desired structure. The first half 302A may also include an aperture 308, which is optional and may be provided as a through hole from the outside of the first half 302A into the cavity 306A so that the mixture, including the polyol component and the isocyanate component, can be poured, e.g., hand-poured, into the mold during a pattern forming operation.

In an analogous manner, the second half 302B of the mold 300 includes an internal cavity 306B that is shaped as an impression of the opposite bisected half of the desired structure relative to the cavity 306A of the first half 302A of the mold 300. In this regard, when the first half 302A and the second half 302B are mated together, the overall mold cavity defines the desired shape of a foam pattern structure to be formed.

In the illustrative, but non-limiting example, the mold 300 is used to form an elbow. The non-limiting, but illustrative elbow includes a channel passageway that extends entirely through the elbow. As such, a temporary core 310, e.g., a wax core in the shape of the internal feature of the desired passageway through the elbow, is laid into the channel 304B of the second mold half 302B. Notably, in the illustrative example, the core 310 sticks outside of the pattern defined by the cavity, but is held inside of the mold. As such, the business portion of the core 310 will be exposed to a mixture that produces the foam pattern, and the ends of the core, i.e., the core print, will extend from the pattern to support the core 110 in a desired position during pattern forming operations.

By way of illustration, and not by way of limitation, a method of creating a foam pattern, e.g., an elbow or other desired foam pattern structure is implemented by mixing a polyol component and an isocyanate component to form a liquid mixture. The mixture includes any necessary additional components. For instance, the mixture may be formulated by also adding a skin forming agent to the mixture, etc. In practice, the mixture can be formulated using any of the techniques set forth more fully herein.

A temporary core having a shape corresponding to a desired feature is placed in a cavity of a mold. For instance, as illustrated, the generally cylindrically shaped temporary wax core 310 is inserted into the channel 304B. This temporary core 310 will create a feature that extends from the surface of the foam pattern and extends through the foam pattern when the foam pattern is formed, as will be described in greater detail below. However, in practice, the feature need not extend entirely through the foam pattern. Rather, for instance, the feature can extend from the surface of the foam pattern into the internal volume of the foam pattern.

In this regard, once the temporary core 310 is installed in the channel 304B, the first half 302A of the mold 300 is mated with the second half 302B of the mold 300. Once assembled, the core print of the temporary core 310 will extend from the pattern within the mold. After assembling the mold 300, the mixture is inserted into the cavity of the mold 300. For instance, the mixture can be inserted to flow into the cavity so as to surround a portion of the temporary core, e.g., by hand pouring the mixture through the opening aperture 308 in the first mold half 302A. Once the mixture is inserted into the mold, the method waits for a predetermined time sufficient for a reaction from the mixture to form a foam pattern structure corresponding to the cavity of the mold, wherein the foam pattern structure encloses a portion of the temporary core. In this manner, the temperature of the mold 300, the temperature and other parameters of the mixture, etc., are controlled so that the reaction of the mixture does not cause the temporary core to deform or otherwise deviate significantly from the desired feature shape.

Figure 9:
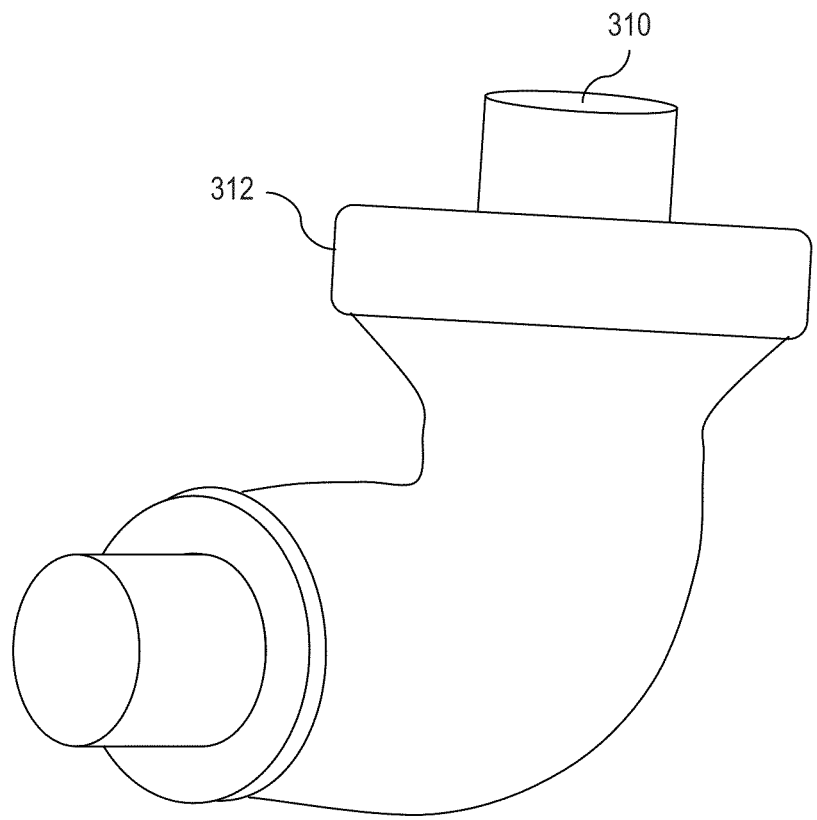
FIG. 9 is an illustration of an exemplary foam pattern structure in the shape of an elbow formed using the mold of FIG. 8, illustrating the temporary core embedded therein.

Referring to FIG. 9, after patterning, a foam pattern structure 312 in the shape of the elbow is provided, having the core 310 extending through the elbow.

After the foam pattern is formed, the temporary core 310 is removed from the pattern independent of chemical leaching. For instance, where a low-melting point temporary core is placed in the cavity of the mold, the mixture is formulated such that the resulting foam pattern structure exhibits a characteristic wherein the foam pattern structure will not distort at a temperature within a range necessary to cause the low-melting point temporary core to melt. Accordingly, the temporary wax core is removed from the foam pattern by applying heat to the foam pattern structure sufficient to melt the temporary core out of the foam pattern structure without causing distortion of the foam pattern structure. When using a low melting temperature core, the method further comprises controlling the mold temperature and mixture temperature to be below the temperature required to melt the temporary core when the mixture is inserted into the mold.

Thus, by way of example, the low-melting core 310 may comprise a low melting temperature wax core that melts at a temperature of up to 200 degrees Fahrenheit (approximately 93.3 degrees Celsius). In this implementation, the mixture is formulated, for example, to form a foam pattern structure that requires a temperature of at least 300 degrees Fahrenheit (approximately 149 degrees Celsius) to distort. Other temperature ranges may alternatively be implemented.

Figure 10:
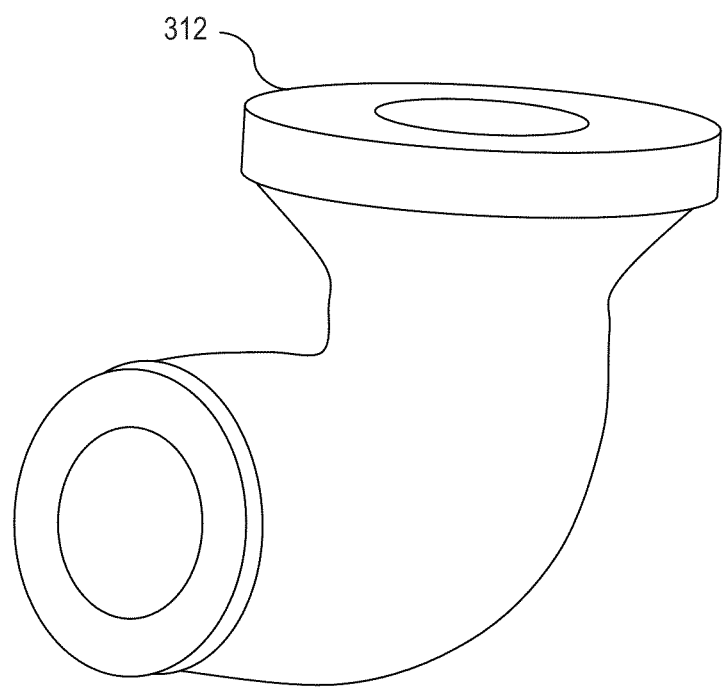
FIG. 10 is an illustration of the exemplary foam pattern of FIG. 9 after the temporary core is removed, using a non-chemical leaching process, according to aspects of the present invention.

Referring to FIG. 10, after removing the core 310 from the foam pattern 312 independent of chemical leaching, an elbow is realized having a passageway there through.

Expendable Foam Support Structures.

According to still further aspects, it may be necessary at times to support the core 310 within the cavity of the mold, e.g., while the mixture is being inserted into the mold, while waiting for the mixture reaction to form a foam pattern structure, etc. Accordingly, in certain illustrative implementations, expendable foam support structures are used to support the temporary core within the mold during patterning operations. The foam support structures are termed "expendable" because the foam support structures will integrate/assimilate into the foam pattern itself.

As an illustrative example, a method of creating a foam pattern comprises mixing a polyol component and an isocyanate component to form a liquid mixture as described more fully herein. The method further comprises using the mixture to form at least one expendable foam support structure, e.g., a pin, holder or other necessary structure to support the temporary core. The expendable foam support structure can be made using a suitable mold and other techniques as set out more fully herein. Moreover, the expendable foam support structures can be constructed from the same mixture used to form the desired foam pattern structure. Alternatively, foam pattern structures, e.g., in the shape of pins, holders, etc., can be prepared in advance using the same mixture, or a different mixture of a polyol component and isocyanate component, as described more fully herein.

Figure 11:
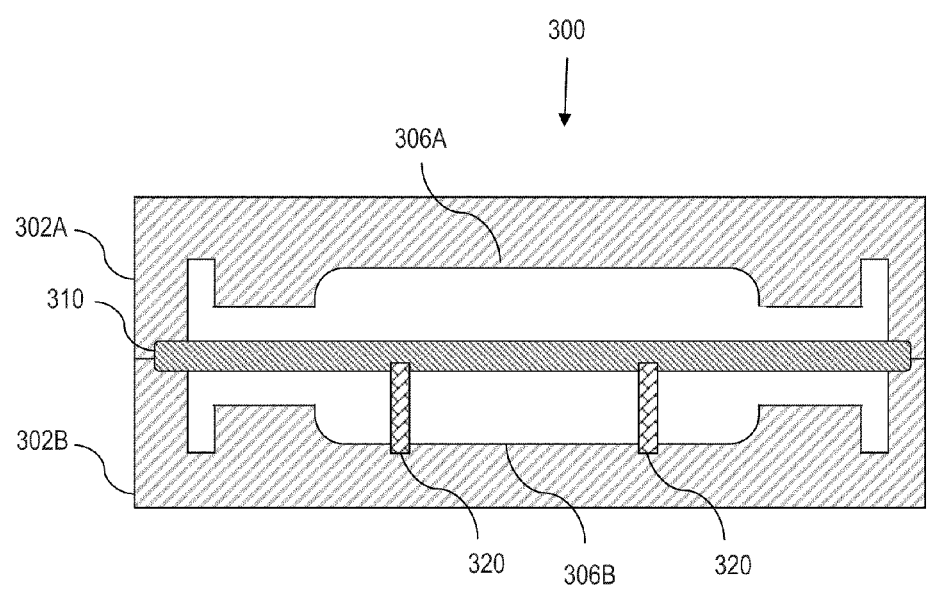
FIG. 11 is an illustration of a mold where foam pattern support structures are used to support a temporary core during processing to form a corresponding foam pattern structure.

The method further comprises placing at least one expendable foam support structure in a cavity of a mold. Referring to FIG. 11, expendable foam support structures 320, e.g., foam pins, are each inserted into a corresponding aligning depression in the mold to aid in proper alignment of the support pins. The method still further comprises placing a temporary core in the cavity of the mold so as to be at least partially suspended from the cavity walls by at least one expendable foam support structure placed in the cavity. Again, as illustrated in FIG. 11, the expendable foam support structures 320 are received into depressions in a corresponding temporary core 310, e.g., a low-melting temperature wax core. Also as illustrated in FIG. 11, the expendable foam support structures 320 suspend the temporary core 310 away from the walls of the cavity 306A, 306B within the mold 300, in this illustrative example.

The method further comprises inserting the mixture into the cavity of the mold so that the mixture flows into the cavity and surrounds at least a portion of the temporary core and surrounds around at least a portion of each inserted expendable foam support structure. In this regard, the support structures can be left in place within the mold cavity, and will become an integral part of the foam pattern structure when the foam pattern structure is formed.

Also, the method comprises waiting for a predetermined time sufficient for a reaction from the mixture to form a foam pattern structure within the mold corresponding to the shape of the cavity of the mold, wherein the foam pattern structure encloses at least a portion of the temporary core and integrates each expendable foam support structure into the foam pattern structure. Once cured, the method comprises removing the foam pattern structure having the core therein, from the mold and removing the temporary core from the foam pattern structure independent of chemical leaching.

Notably, there is no need to remove the expendable foam support structures that are now integrated into the foam pattern. Because the expendable foam support structures are themselves foam, they will burn out during subsequent processing in a manner analogous to the remainder of the resulting foam structure.

Referring again to FIG. 11, the temporary core 310 is supported by foam pins 320 made of the foam pattern material. In this application, the foam pattern pins eliminate the need for metal or other non-foam pins used to support the temporary core 310 during pattern formation, eliminates the necessity of negatives, etc. because the mixture will integrate with the foam pattern pins.

In illustrative exemplary implementations, the foam pattern structure comprises an aggregate pattern density of not more than 8 pounds per cubic foot after the temporary core is removed from the foam pattern structure. In yet further alternative embodiments, the foam pattern structure can exceed 8 pounds per cubic foot in aggregate pattern density, e.g., where a particular application requires relatively greater aggregate density.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

The flowchart and block diagrams in the Figures illustrate the architecture, functionality, and operation of possible implementations of systems and methods according to various embodiments of the present invention. In this regard, one or more blocks in the flowchart or block diagrams may represent a component, segment, etc., which comprises one or more logical function(s). In some alternative implementations, the functions noted in the blocks may occur out of the order noted in the figures. For example, two blocks shown in succession may, in fact, be executed substantially concurrently or in the reverse order.

Having thus described the various aspects of the invention in detail and by reference to embodiments thereof, it will be apparent that modifications and variations are possible without departing from the scope of the invention defined in the appended claims.

What is claimed is:

1. A method of creating a fugitive foam pattern used to make a shell mold for an investment casting operation, the method comprising:

mixing a polyol component and an isocyanate component to form a liquid mixture;

adding at least one additive to the mixture of the polyol component and the isocyanate component;

placing a temporary core having a shape corresponding to a desired feature of a resulting foam pattern in a cavity of a mold;

inserting the mixture into the cavity of the mold such that the mixture flows into the cavity and surrounds a portion of the temporary core;

waiting for a predetermined time sufficient for a reaction from the mixture to form a thermoset rigid foam pattern structure within the mold corresponding to the shape of the cavity, wherein the foam pattern structure encloses around a portion of the temporary core-such that:

the foam pattern structure formed from the mixture includes a continuous, unbroken skin that prevents a slurry from penetrating the foam pattern surface when forming a shell mold using the foam pattern structure; and the formulation and density of the foam pattern structure is configured to be thermally collapsible such that the shell mold does not crack during the removal of the foam pattern structure through a burn out process;

removing the foam pattern structure from the mold; and removing the temporary core from the foam pattern structure independent of chemical leaching such that the resulting foam pattern structure has the desired feature.

2. The method according to claim 1, wherein:

placing a temporary core comprises placing a low-melting point temporary core in the cavity of the mold;

mixing a polyol component and an isocyanate component to form a liquid mixture comprises forming the mixture such that the resulting foam pattern structure exhibits a characteristic wherein the foam pattern structure will not distort at a temperature within a range necessary to cause the low-melting point temporary core to melt; and removing the temporary core comprises applying heat to the foam pattern structure sufficient to melt the temporary core out of the foam pattern structure without causing distortion of the foam pattern structure.

3. The method according to claim 2, wherein the temporary core comprises a low melting temperature wax that melts at a temperature of up to 200 degrees Fahrenheit (approximately 93.3 degrees Celsius) and wherein the foam pattern structure requires a temperature of at least 300 degrees Fahrenheit (approximately 148.8 degrees Celsius) to distort.

4. The method according to claim 1, wherein placing a temporary core comprises placing the temporary core within the mold so as to extend out of the cavity of the mold such that the mold supports the temporary core in a desired position.

5. The method according to claim 1, further comprising:

providing the mold having the mold cavity tooled from at least one of a plastic, rubber or composite mold.

6. The method according to claim 1, wherein:

inserting the mixture into the cavity of the mold comprises hand pouring the mixture into an opening of the mold.

7. The method according to claim 1, further comprising:

controlling the mold temperature and mixture temperature to be below the temperature required to melt the temporary core.

8. The method according to claim 1, wherein:

the foam pattern structure comprises an aggregate pattern density of not more than 8 pounds per cubic foot after the temporary core is removed from the foam pattern structure.

9. The method according to claim 1, further comprising:

forming at least one temporary support member as a foam support structure; and inserting at least one foam support structure within the cavity of the mold so as to support a portion of the temporary core;

wherein:

the reaction from the mixture forms the foam pattern structure so as to integrate each foam support structure into the foam pattern structure.

10. The method according to claim 9, wherein:

the foam support structures comprise foam pins that are formed from the mixture of the polyol component and the isocyanate component.

11. A method of creating a fugitive foam pattern used to make a shell mold for an investment casting operation, the method comprising:

mixing a polyol component and an isocyanate component to form a liquid mixture;

using the mixture to form at least one expendable foam support structure;

placing at least one expendable foam support structure in a cavity of a mold;

placing a temporary core in the cavity of the mold so as to be at least partially suspended from the cavity walls by at least one expendable foam support structure placed in the cavity;

inserting the mixture into the cavity of the mold so that the mixture flows into the cavity and surrounds at least a portion of the temporary core and surrounds around at least a portion of each inserted expendable foam support structure;

waiting for a predetermined time sufficient for a reaction from the mixture to form a thermoset rigid foam pattern structure within the mold corresponding to the shape of the cavity of the mold, wherein the foam pattern structure encloses at least a portion of the temporary core and integrates each expendable foam support structure into the foam pattern structure such that:

the foam pattern structure formed from the mixture includes a continuous, unbroken skin that prevents a slurry from penetrating the foam pattern surface when forming a shell mold using the foam pattern structure; and the formulation and density of the foam pattern structure is configured to be thermally collapsible such that the shell mold does not crack during the removal of the foam pattern structure through a burn out process;

removing the foam pattern structure having the core therein, from the mold; and removing the temporary core from the foam pattern structure independent of chemical leaching.

12. The method according to claim 11, further comprising:

configuring a cavity of a support structure mold to produce each expendable foam support structure implemented as a foam pin.

13. The method according to claim 12, further comprising:

hand pouring the mixture into an opening of the support structure mold to fabricate each foam pin.

14. The method according to claim 13, wherein:

placing a core comprises placing a low-melting point temporary core in the cavity of the mold;

mixing a polyol component and an isocyanate component to form a liquid mixture comprises forming the mixture such that the resulting foam pattern structure exhibits a characteristic wherein the foam pattern structure will not distort at a temperature within a range necessary to cause the low-melting point temporary core to melt; and removing the core comprises applying heat to the foam pattern structure sufficient to melt the low-melting point temporary core out of the foam pattern structure without causing distortion of the foam pattern structure.

15. The method according to claim 14, wherein the temporary core comprises a low melting temperature wax that melts at a temperature of up to 200 degrees Fahrenheit (approximately 93.3 degrees Celsius) and wherein the foam pattern structure requires a temperature of at least 300 degrees Fahrenheit (approximately 149 degrees Celsius) to distort.

16. The method according to claim 13, wherein placing a temporary core comprises placing the temporary core within the mold so as to extend out of the cavity of the mold such that the mold supports the temporary core in a desired position.

17. The method according to claim 13, wherein:
providing the mold having the mold cavity tooled from at least one of a plastic, rubber or composite mold.

18. The method according to claim 13, further comprising:
controlling the mold temperature and mixture temperature to be below the temperature required to melt the core.

19. The method according to claim 11, wherein:
inserting the mixture into the cavity of the mold comprises hand pouring the mixture into an opening of the mold.

20. The method according to claim 11, wherein:
the foam pattern structure comprises an aggregate pattern density of not more than 8 pounds per cubic foot after the temporary core is removed from the foam pattern structure.

* * * * *